United States Patent [19]

Noguchi et al.

[11] Patent Number: 4,759,119
[45] Date of Patent: Jul. 26, 1988

[54] METHOD OF FABRICATING A MAGNETIC HEAD ASSEMBLY

[75] Inventors: Ichiro Noguchi, Nagaoka; Kazuo Kobayashi, Furukawa; Toru Sawada, Furukawa; Masao Okita, Furukawa; Yasunari Takayama, Yokohama; Kazuo Kozumi, Furukawa, all of Japan

[73] Assignee: Alps Electric Co., Ltd., Japan

[21] Appl. No.: 904,494

[22] Filed: Sep. 5, 1986

[30] Foreign Application Priority Data

Sep. 10, 1985 [JP] Japan .................... 60-198430

[51] Int. Cl.$^4$ ............................. G11B 5/42
[52] U.S. Cl. ....................... 29/603; 29/418; 360/104
[58] Field of Search ............... 29/603, 418; 360/103, 360/104

[56] References Cited

U.S. PATENT DOCUMENTS

| | | | |
|---|---|---|---|
| 3,460,244 | 8/1969 | Metz | 29/603 |
| 3,975,770 | 8/1976 | Spash et al. | 360/103 |
| 4,520,555 | 6/1985 | Gyi et al. | 360/104 X |
| 4,625,249 | 11/1986 | Iwata | 360/104 |

Primary Examiner—Carl E. Hall
Attorney, Agent, or Firm—Guy W. Shoup; Leighton K. Chong

[57] ABSTRACT

A magnetic head assembly of a disk drive device has an upper magnetic head fastened to a case side and a lower magnetic head mounted on a gimbal plate of a carriage side. The upper case assembly includes a plurality of leaf hinge springs extending to the vicinity of the upper magnetic head, which is bonded to a supporting plate, and wire leads from the magnetic head are soldered to the leaf hinge spring ends as lead terminals. The other ends of the leaf hinge springs extend to the rear side of the case and serve both as a pivotable hinge mounting of the case to the carriage and as lead terminals to an external read/write controller. The upper case assembly is formed by molding in resin a flat plate which is precut with the leaf hinge spring and supporting plate portions formed in a predetermined shape, cutting the flat plate thus insert molded to separate the plate and a plurality of lead terminals independently, fastening the upper magnetic head to the plate, and connecting the lead wires from the fastened magnetic head to the predetermined divided lead terminals. Thus, the magnetic head assembly can be accurately manufactured inexpensively.

3 Claims, 2 Drawing Sheets

METHOD OF FABRICATING A MAGNETIC HEAD ASSEMBLY

BACKGROUND OF THE INVENTION

This invention relates to a magnetic head assembly of floppy disk drive for use in external memories of various information devices such as word processors, or personal computers. More particularly, the invention relates to a magnetic head assembly of both-side floppy disk drives comprising upper and lower magnetic head assemblies for writing and reading information fed radially of the disk.

PRIOR ART

A magnetic head assembly in which a magnetic head provided in an upper magnetic head assembly was fastened to a case of the assembly and a magnetic head provided in a lower magnetic head assembly and hence a magnetic head provided at a carriage side was mounted on a gimbal plate to allow the lower magnetic head to follow to the surface of a disk has been disclosed, for example, in Japanese Patent Publication No. 147160/1982. This prior invention has been made for its object to provide a magnetic head to produce an output signal in a stable state. In this publication, the magnetic head mounted directly on an arm has been disclosed as an embodiment, and the head further mounted directly on a leaf spring as a modified embodiment.

However, in the conventional magnetic head assembly in which the head was mounted directly on the arm (the case), a gap forming surface of the upper magnetic head becomes a reference surface of the disk, and the accuracy of the arm for mounting the head is important. In the head assembly in which the head is mounted directly on the leaf spring, it is difficult to align the upper magnetic head with the reference surface due to the deformation of the spring.

SUMMARY OF THE INVENTION

It is therefore an object of the present invention to provide an upper magnetic head assembly capable of obtaining an accurate reference surface and a method of fabricating the same.

According to one aspect of the present invention, there is provided a magnetic head assembly of a disk drive device having an upper magnetic head fastened to a case side and a lower magnetic head mounted on a gimbal plate of a carriage side comprising a plurality of leaf hinge springs extending to the vicinity of the upper magnetic head for supporting the upper magnetic head assembly movably to the lower magnetic head assembly, a plate of nonelastic structure for fastening the upper magnetic head thereon, and lead wires from the magnetic head being connected to the ends of the leaf hinge springs as lead terminals.

According to another aspect of the present invention, there is provided a method of fabricating a magnetic head assembly comprising the steps of forming a plate for fastening an upper magnetic head and a leaf spring used as a lead terminal and a leaf hinge spring of a flat plate to insert mold the flat plate with synthetic resin material in a predetermined shape, cutting the flat plate thus insert molded to the plate and a plurality of lead terminals independently, fastening the upper magnetic head to the plate, and connecting the lead wires lead from the fastened magnetic head to the predetermined divided lead terminals. Thus, the magnetic head assembly can be accurately manufactured inexpensively.

The above and other objects, features and advantages of the present invention will become apparent from the following detailed description of a preferred embodiment when taken in conjunction with the accompanying drawings.

DESCRIPTION OF THE PREFERRED EMBODIMENTS

An embodiment of a magnetic head assembly according to the present invention will be described with reference to the accompanying drawings.

Figure 1:
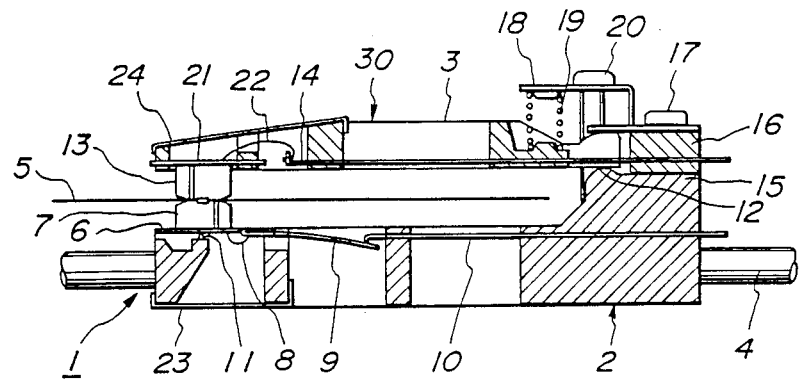
FIG. 1 is a sectional view of an embodiment of a magnetic head assembly according to the present invention.

FIG. 1 is a sectional view of an embodiment of a magnetic head assembly according to the invention. In FIG. 1, a magnetic head assembly 1 has a lower magnetic head assembly 2 and an upper magnetic head assembly 30, and is fed radially of a magnetic disk 5 along a guide shaft 4 by a pulse motor, not shown.

On the lower magnetic head assembly (hereinafter referred to as "a carriage") 2 is mounted a lower magnetic head 7 through a gimbal plate 6 at the end. The head assembly 2 has a flexible printed board 9 connected from the head 7 to a lead wire 8, and a lead terminal 10 connected with the board 9 and projected from the carriage 2. The terminal 10 is insert molded of insulating synthetic resin by dividing a conductive metal plate into five segments. The carriage 2 thus molded has a pivot 11 contacted with the lower surface of the plate 6 at the mounting portion of the head 7 for attaining the contact with the disk 5, and a contact 12 of a rockable center for positioning the case 3 with respect to the carriage 2 and integrally molded with a synthetic resin material.

The case 3 of the head assembly 30 has an upper magnetic head 13 at the position opposed to the lower head 7 and mounted on a base 15 of the carriage 2 via mounting screws 17 through a clamping plate 16 separably from the head 7 by a leaf hinge spring 14. The case 3 further has a load spring 19 extended from a retainer 18 in contact with the case 3 for elastically urging the case 3 to the carriage 2 side to adjust the elastic force by altering the stroke of a load pressure adjusting screw 20 attached to the retainer 18.

In the case 3 are insert molded a plate 21 of nonelastic structure for mounting the head 13, and the leaf hinge spring 14 extended to the vicinity of the plate 21 in a mold with an insulating synthetic resin material. The spring 14 is divided into five segments, which are respectively connected to five lead wires 22 led from the head 13 mounted via a bonding agent to the plate 21 as a lead terminal. Three of the five wires 22 are used for reading/writing, and two for erasing. The leaf hinge springs (the same as the lead terminal) 14 are correspondingly divided into five segments, and on one side, ends 14a are projected to the end of the plate 16. Shielding plates 23, 24 are respectively mounted on the lower surface of the head 7 and the upper surface of the head 13 to prevent a noise.

A method of forming the plate 21, the spring 12 as a lead terminal and the upper head 13 in the case 3 will be described.

Figure 2:
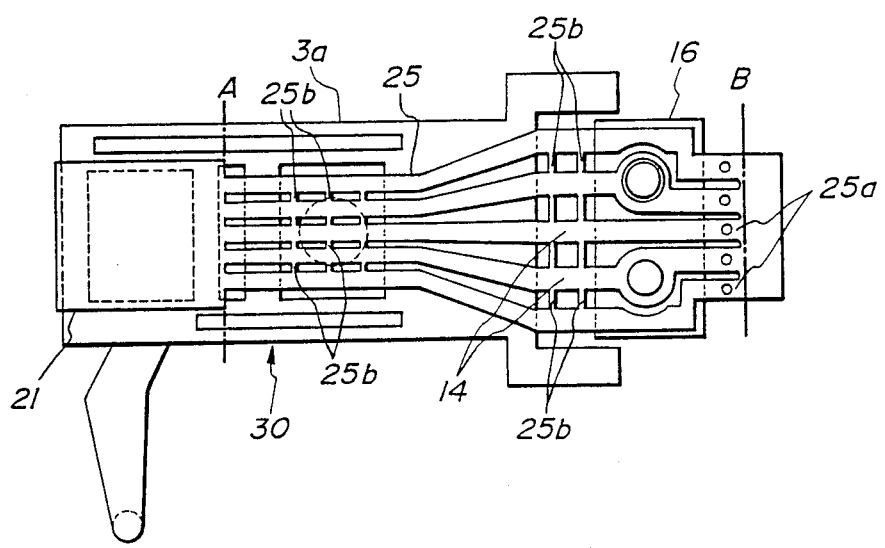
FIGS. 2, 3 and 4 are bottom views showing upper magnetic head assembly respectively illustrating the fabricating steps of the upper magnetic head assembly.
Figure 3:
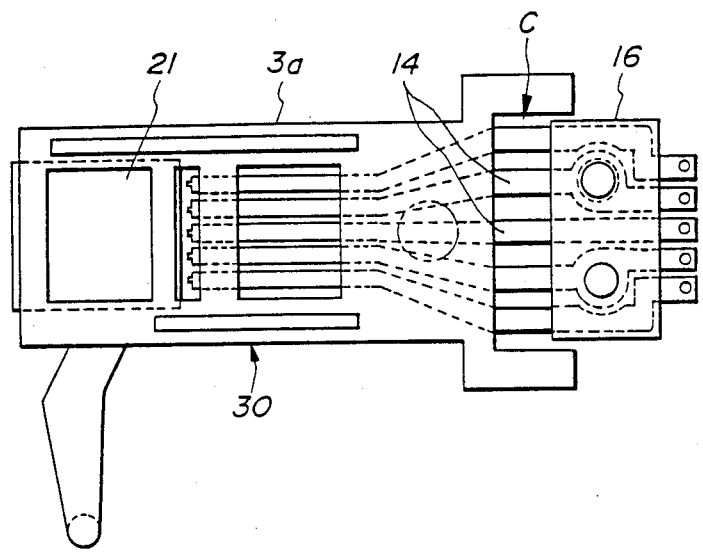
Figure 4:
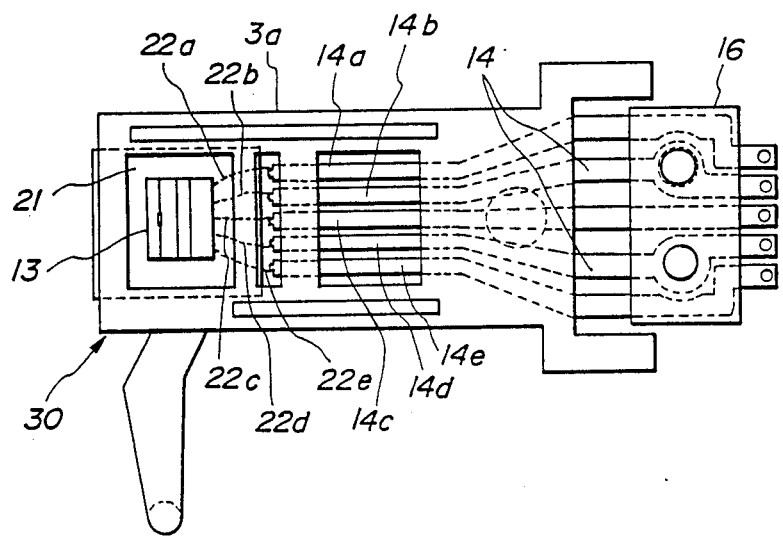

As shown in FIG. 2, the plate 21 and the spring 14 are first integrally molded with conductive leaf spring 25, and the spring 25 is buried in the base 3a of the case 3 made of insulating synthetic resin material and the plate 16. In this case, connecting ends 25a ar projected from the end of the plate 16, and hinges 14a are formed between the plate 16 and the base 3a of the case 3. Then, the plate 21 of the leaf spring 25 and the spring 14 are cut at the position A in FIG. 2, and the ends 25a as the lead terminals of the spring 14 are cut at the position B in FIG. 2, bridges 25b formed at the adjacent lead terminals (independent leaf hinge springs) to the lead terminals divided into five segments are cut off, thereby independently dividing the lead terminals (leaf hinge springs) 14 (FIG. 3).

As described above, after the plate 21 and the spring 14 as the lead terminal are independently formed, the head 13 is mounted via a bonding agent at a predetermined position on the surface of the plate 21 at the carriage 2 side, and five lead wires 22a, 22b, 22c, 22d, 22e led from the head 13 are connected by soldering to the corresponding lead terminals (leaf hinge springs) 14a, 14b, 14c, 14d, 14e, respectively.

When the upper magnetic head assembly 30 having the case 3, the plate 16, the spring 14 as the lead terminal, and the head 13 is formed as described above, the spring 14 has a spring function in the portion C exposed between the base 3a and the plate 16 to allow the head assembly 30 to rotate. Further, the wires 22 led from the head 13 are connected to the end of the spring 14 extended to the vicinity of the plate 21 near the head 13, lead wires, not shown, are connected to the ends 25a projected from the end of the plate 16 as part of the lead wires to be externally led of the head 13.

Thus, the plate 21 for fastening the head 13 and the spring 14 as the lead terminal for external lead from the head 13 can be formed on the same plane surfaces merely by insert molding and cutting one leaf spring 25 molded in a predetermined shape at the predetermined portions. Therefore, there is provided an advantage that no error occurs on the reference surface of the magnetic head due to the finishing work of the arm or the deformation of the leaf spring as in the conventional example.

More particularly, the plate 21 can be readily positioned with respect to the mold of the base 3a, and the head 13 is directly attached to the positioned plate. Thus, the position of the head 13 in molding can be much readily determined as compared with the conventional head assembly. Further, the plate 21 and the spring 14 are formed on the same plane surfaces. Thus, the mounting surface of the head 13 is always in parallel with the rotating fulcrum of the case 3 to cause no error accumulated form other members. Therefore, when mounting the head 13 on the plate 21, the reference surface of the head 13 can be attained in high accuracy merely by notifying the parallelism of the sliding contact surface of the head 13 and the plate 21 as well as the size of the height with respect to the case 3.

According to the method of fabricating the head assembly as described above, the head assembly can be simply manufactured by specifying the accurate plate 21, i.e., the mount of the head 13, and the spring 14 as a lead terminal in a predetermined positional relationship (in the same plane in this embodiment). Further, the plate 21 and the spring 14 are insert molded in the mold. Thus, the bonding step of the constituents includes only bonding the head 13 to reduce the bonding steps as compared with the conventional method of producing by bonding the plate 21 and the spring 14 to the base 3a, thereby inexpensively fabricating the head assembly.

According to the present invention thus constructed and fabricated as described above, the upper magnetic head assembly for attaining accurate reference surface of the magnetic head can be provided, and according to the method of fabricating the magnetic head assembly, the assembly can be manufactured accurately and inexpensively.

What is claimed is:

1. A method of fabricating a magnetic head case assembly supporting a magnetic head, which case assembly is to be pivotably mounted at one end on a mounting portion of a carriage of a disk drive device so that the magnetic head is movable into operative contact with a magnetic disk, comprising:

forming a flat plate of conductive material with pre-cut portions provided therein connected by bridge portions, said precut portions including a magnetic head supporting plate, a plurality of separate leaf hinge springs having proximate ends on one side extending to the vicinity of the head supporting plate and distal ends on another side extending to the mounting portion of said carriage;

insert molding said flat plate integrally in a case body of synthetic resin material, except leaving said bridge portions connecting said precut portions exposed;

cutting said bridge portions so as to separate said precut portions independently of each other;

fastening the magnetic head to said supporting plate and connecting lead wires from the magnetic head to respective ones of said proximate ends of said leaf hinge springs as lead terminals.

2. A method according to claim 1, wherein said distal ends of said leaf hinge springs are mounted to the mounting portion of said carriage to serve both as both a pivotable hinge mounting of the case assembly to the carriage and as lead terminals to an external read/write controller.

3. A method according to claim 2, wherein said supporting plate and said leaf hinge springs are formed in one plane, and the magnetic head is mounted via a bonding agent to a surface of said supporting plate so that a contact surface of the magnetic head is positioned on a reference plane of the magnetic disk defined with respect to the plane of the leaf hinge springs mounted at their distal ends to the mounting portion of said carriage.

* * * * *